United States Patent
Gradzki

(10) Patent No.: US 12,040,842 B2
(45) Date of Patent: Jul. 16, 2024

(54) ACOUSTIC LENS MULTI-BEAM COMMUNICATION SYSTEM

(71) Applicant: Booz Allen Hamilton Inc., McLean, VA (US)

(72) Inventor: Pawel Miroslaw Gradzki, McLean, VA (US)

(73) Assignee: Booz Allen Hamilton Inc., McLean, VA (US)

(*) Notice: Subject to any disclaimer, the term of this patent is extended or adjusted under 35 U.S.C. 154(b) by 321 days.

(21) Appl. No.: 17/383,407

(22) Filed: Jul. 22, 2021

(65) Prior Publication Data

US 2023/0027558 A1    Jan. 26, 2023

(51) Int. Cl.
*H04B 11/00* (2006.01)

(52) U.S. Cl.
CPC .................................. *H04B 11/00* (2013.01)

(58) Field of Classification Search
CPC ....................................................... H04B 11/00
See application file for complete search history.

(56) References Cited

U.S. PATENT DOCUMENTS

2019/0071962 A1*  3/2019  Gottlieb ................. H04B 11/00

OTHER PUBLICATIONS

Rotman, W. & Turner, R. F., "Wide-Angle Microwave Lens for Line Source Applications", IEEE Transactions on Antennas and Propagation, 11(6), IEEE, 1963, 10 pgs.
Sciannella, C. & Toso, G., "An Imaging Reflector System with Reduced Scanning Aberrations", IEEE Transactions on Antennas and Propagation, 63(4), Apr. 2015, 9 pgs.
Jankovic, P., et al., "Active Multibeam Antennas based on Rotman Lens Arrays", 2019 IEEE International Symposium on Phased Array System & Technology, 2019, 3 pgs.

* cited by examiner

*Primary Examiner* — Daniel D Chang
(74) *Attorney, Agent, or Firm* — Volpe Koenig

(57) ABSTRACT

A communication system is disclosed. The communication system includes a communication device comprising one of a receiver, a transmitter, or a transceiver; and an acoustic lensing subsystem, wherein the acoustic lensing subsystem is configured to: convert electrical signals into acoustic signals; focus the acoustic signals to generate focused acoustic signals; and output the focused acoustic signals.

21 Claims, 4 Drawing Sheets

ACOUSTIC LENS MULTI-BEAM COMMUNICATION SYSTEM

BACKGROUND

Telecommunications equipment for transmitting, receiving, and processing electromagnetic spectrum signals is in extremely widespread use. A huge variety of such device exist, and improvements are constantly being made.

DETAILED DESCRIPTION OF THE PREFERRED EMBODIMENT(S)

Figure 1A:
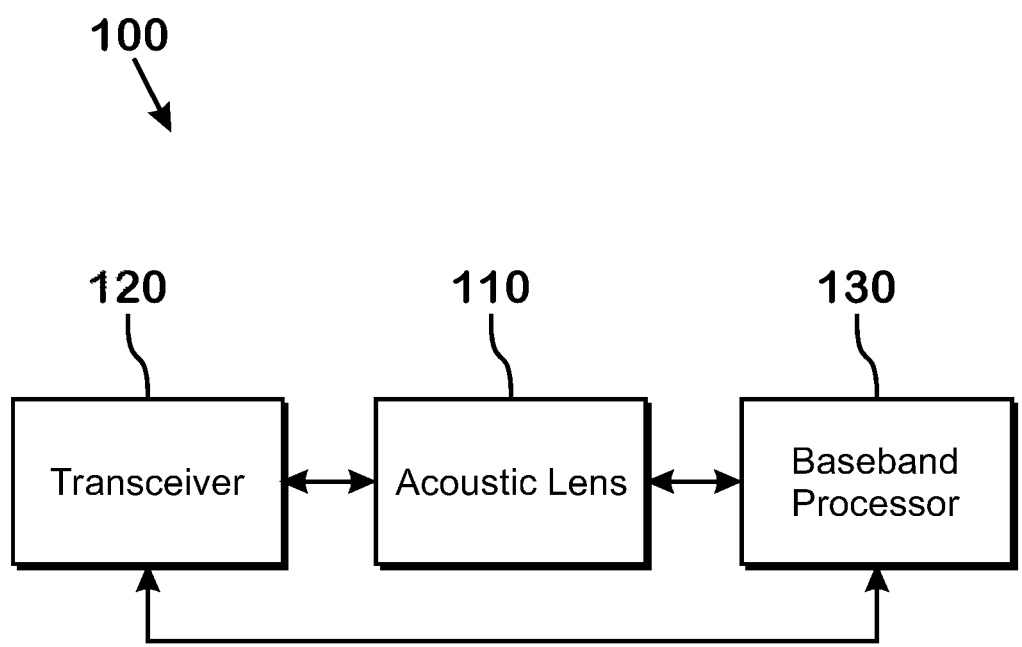
FIG. 1A illustrates an acoustic lens multi-beam communication system, according to an example.

FIG. 1A illustrates an acoustic lens multi-beam communication system 100, according to an example. The communication system 100 includes a baseband processor 130, a lensing subsystem 110, and a transceiver subsystem 120.

The baseband processor 130 controls the lensing subsystem 110 and transceiver subsystem 120 to operate in a receive mode of operation or a transmit mode of operation. During the receive mode of operation, the transceiver subsystem 120 receives radio frequency electromagnetic signals, processes those signals, and provides the processed signals to the lensing subsystem 110. The lensing subsystem 110 converts the signals to acoustic signals and transmits the acoustic signals using transducers at antenna ports 107 and beam ports 108 through an acoustic lens, which focuses the signals. The focused signals are received by beam ports 108 (shown in FIG. 1B and described in more detail below), which convert the acoustic signals back to baseband electrical signals and provides those electrical signals to subsequent circuitry (not shown) for processing. During the transmit mode of operation, lensing subsystem 110 converts baseband electrical signals fed into beam ports 108 into acoustic waves, transmitted through the acoustic lens, and converts those acoustic waves back into electrical signals to drive the transceiver subsystem 120 for radio electromagnetic transmission into the air or space.

The focusing of the acoustic signals modifies the acoustic waves propagating through the lens in a manner that allows an "image" of the radio frequency signals to form within the lensing subsystem 110. The term "image" means a projection in which different locations within the projection correspond to different physical locations in space external to the communications system 100. More specifically, as described above, electromagnetic signals are incident on the antennas of the transceiver subsystem 120. It is not immediately discernable how to separate signals from sources that are at different physical locations. The acoustic lensing subsystem 110 focuses acoustic waves to generate an image in which different locations within that image correspond to different locations in space, which allows distinguishing between different radio frequency sources by examining the signals at different locations on the generated image.

It would be possible to build a lens directly for radio frequency electromagnetic signals, without conversion to acoustic waves. However, such a lens would have very large dimensions due to the large wavelength and high velocity of radio frequency electromagnetic waves. Conversion to acoustic waves allows use of a much smaller lens due to sound waves having a relatively lower velocity and wavelength than radio frequency electromagnetic waves.

Figure 1B:
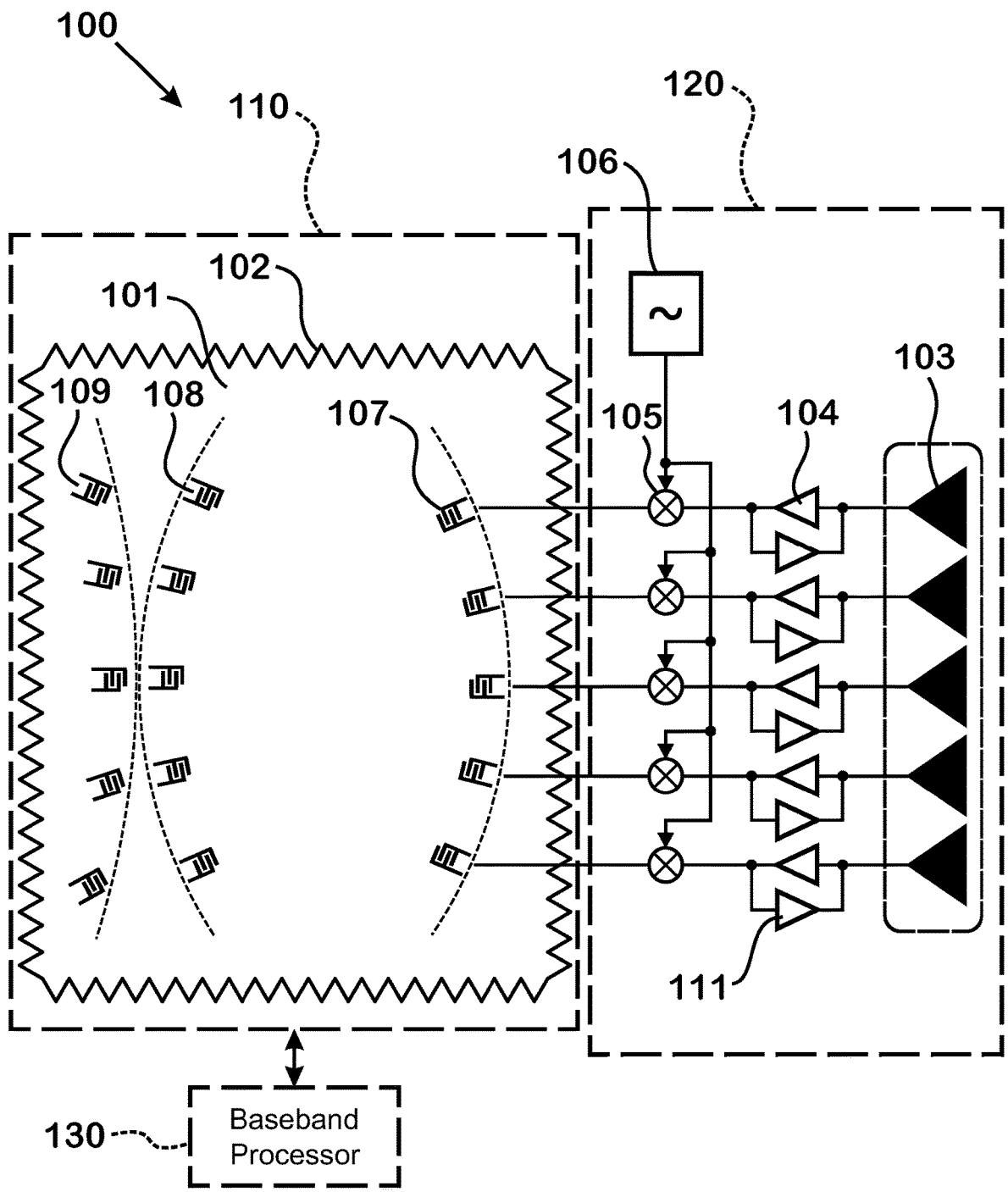
FIG. 1B illustrates details of the communication system of FIG. 1, according to an example.

FIG. 1B illustrates the system 100 of FIG. 1A in greater detail. The transceiver subsystem 120 includes an antenna array 103 which receives radio frequency electromagnetic signals and converts those signals to electrical signals. A receiving amplifier array 104 amplifies the received electrical signals. A set of optional mixers 105 converts the amplified electrical signals with a signal produced by a local oscillator 106 to generate baseband intermediate frequency (IF) electrical signals for provision to the lensing subsystem 110. During the transmit mode of operation, the transmitting amplifier array 111 amplifies signals provided to the antenna for transmission.

Antenna ports 107 of the lensing subsystem 110 convert the IF electrical signals into acoustic signals and apply those acoustic signals to an acoustic lensing substrate 101. The acoustic lensing substrate 101 focuses the acoustic signals for reception by beam ports 108. The beam ports 108 convert the focused acoustic signals into electrical signals for processing by subsequent baseband electronics, which are not shown.

The physical arrangement of acoustic transducers on the acoustic lensing substrate 101—and specifically, the portion between the antenna ports 107 and the beam ports 108—causes the acoustic waves passing through the lensing substrate 101 to be focused. The image is formed on the beam ports 108 so that different beam ports 108 are able to receive signals that originate from different physical locations or beams external to the communication system 100.

In some examples, the lensing substrate 101 includes an acoustically damped edge transition 102. Undesirable acoustic wave reflections from the edges can interfere with desirable signal propagation between transducers, reducing signal-to-interference ratio. This edge transition 102 is shaped to lessen the acoustic reflections from the lensing substrate 101. In some examples, the physical shape of the edge transition 102 performs this function.

In some examples, the lensing substrate 101 is a piezoelectric material such as a quartz compound. Piezoelectric materials are materials that convert mechanical stress into electrical signals and electrical signals into mechanical stress. For the alternating voltage signals provided by the mixers 105, the piezoelectric effect generates acoustic signals. In this example, where the lensing substrate 101 is a piezoelectric material, the antenna ports 107 comprise an electrically conductive interface between wires that receive electrical signal from the mixers 105 and that terminate on the lensing substrate 101. The physical contact between the lensing substrate 101 and this electrically conductive interface results in the conversion of the electrical signals on the wires into acoustic waves within the lensing substrate 101.

Beam ports 108 include interfaces with electrically conductive material. Via the piezoelectric effect, these beam ports 108 convert the focused acoustic waves into electrical signals at each of the individual beam ports 108. The beam ports 108 are couplable to additional wires that provide the output electrical signals to a baseband processor 130. Due to the focusing action of the lensing substrate 101, the different beam ports 108 output electrical signals that correspond to different physical locations or beams in space external to the communication system 100.

Although not illustrated in FIG. 1, it should be understood that in various implementations, subsequent circuitry and/or an additional external system processes the signals output from the beam ports 108. Such external circuitry and/or external system has any technically feasible composition or function. In various examples, these elements process the raw signals obtained from the lensing substrate 101, such as by logically separating signals from different external sources, performing additional signal processing, digitizing the signals, combining channels or data streams, separating into multiple channels or data streams, filtering noise, interference, clutter or performing any of a wide variety of other operations.

In some implementations, a baseband processor 130 controls certain aspects of the communication system 100. The baseband processor 130 is implementable in any technically feasible manner, such as in hard-wired circuitry, as software or firmware executable on a processor, or as a combination thereof.

Some aspects controllable by the baseband processor 130 are now described. One controllable aspect includes calibration of the antenna ports 107 to account for the possibility that signals entering the lensing substrate 101 from different antenna ports 107 are out of phase. More specifically, radio frequency signals incident on different antenna elements of the antenna array 103 are considered to be coherent or in phase and produce acoustic images on the central output port of beam ports 108. If the angle of arrival of the radio frequency signals is off axis of the antenna array 103, the acoustic image focuses on beam ports away from the center port, proportionally to the angle of arrival of the radio signal at the antenna. However, due to variations in propagation delay between the antenna array 103 and the antenna ports 107, it is possible for such signals to contain gain and/or phase errors. Piezoelectric material properties change under an electric field bias. The baseband processor 130 therefore, in some situations, applies a direct current ("DC") voltage or slowly changing bias to one or more of the antenna ports 107 to adjust the gain and/or phase to compensate for the described variations. In various examples, the baseband processor 130 determines the necessary DC biases by observing the signal output by the beam ports 108, detecting gain and/or phase anomalies in the signal at the antenna ports 107, and adjusting DC voltage biases to the different antenna ports 107 to substantially remove the anomalies. The baseband processor 130 also enables receiving amplifier array 104 during receive mode of operation and transmitting amplifier array 111 during transmit mode of operation.

As stated above, the physical geometry of the lensing substrate 101 between the antenna ports 107 and the beam ports 108 dictates the focusing characteristics of the substrate 101. Although this portion of the lensing substrate 101 is illustrated as a simple, biconvex lens, the teachings of the present disclosure are not so limited. For instance, it is possible for the lensing substrate 101 to include multiple lens elements with similar or different refractive indices that together produce a better "image" on the beam ports 108 than a simple, single element lens could achieve. Any technically feasible lens configuration could be used. Note that the internal lens elements—elements that do not have surfaces incident on antenna ports 107 or beam ports 108—do not need to be a piezoelectric material.

In addition, the physical layout of the antenna ports 107 and/or beam ports 108 is not limited to the illustrated layout, which should be taken as an example. More specifically, the physical layout of the antenna ports 107 and/or beam ports 108 affect the manner in which the acoustic waves are focused. Thus, the present disclosure contemplates implementations in which these physical layouts are shaped in any technically feasible manner. Such variations in physical layouts may serve a variety of purposes, such as correcting aberrations, or providing other benefits. The term "aberrations" refers to deviations in the focused image from an image in which each individual point in the image corresponds exactly to a single point in space.

Figure 2:
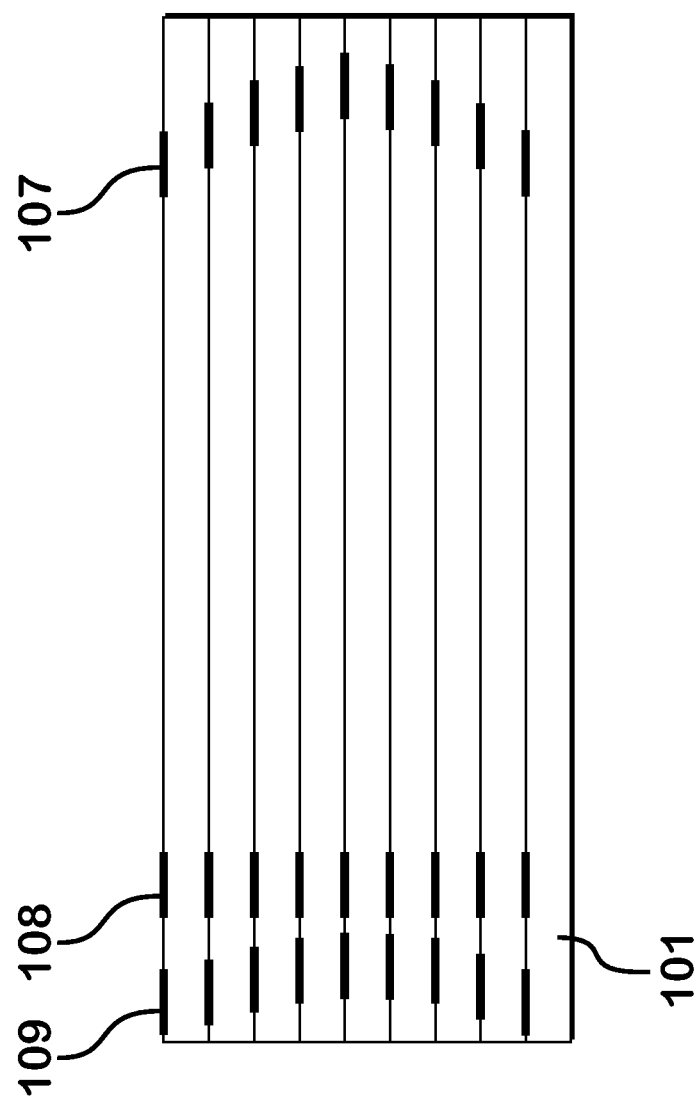
FIG. 2 illustrates a three-dimensional acoustic lens capable of forming a two-dimensional image of the radio signals, according to an example.

It is possible to vary the field of view by using additional sets of beam ports 109 closer or further away from the antenna ports 107. For example, generating an image from a second set of beam ports 109 positioned further away from the antenna ports 107 generates an image with a smaller field of view, "zoomed in" on a part of the external environment. In addition, implementations on stacked lensing substrates 101 are contemplated, as shown in FIG. 2 in which the first set of beam ports 108 are a two-dimensional array, allowing a two-dimensional image of the environment to be generated. More specifically, in FIG. 2, a series of stacked lensing substrates 101 is shown. Each such lensing substrate 101 includes a first beam port 108 and a second beam port 109, as well as an antenna port 107 that functions similarly to what is described above. The transceiver subsystem 120 provides electrical signals from the top of the figure for lensing. The communication system 100 can be configured to receive or transmit electromagnetic waves having different polarization and route the resulting electrical signal to separate ports. In one embodiment the signals from those ports can be routed to separate acoustic lenses for processing. Alternatively, transducers producing acoustic waves having different vibration modes can be employed in a single acoustic lens, enabling signal separation corresponding to electromagnetic waves received and transmitted by polarized ports of an antenna.

Figure 3:
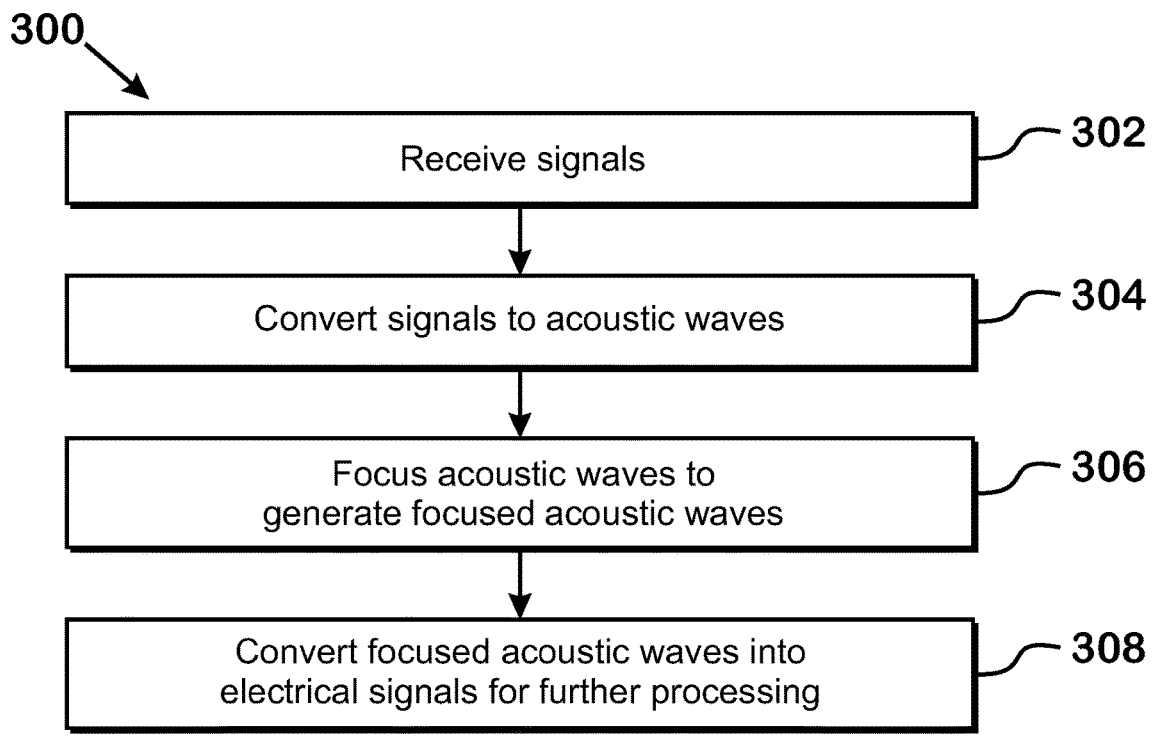
FIG. 3 is a flow diagram of a method for receiving signals with the communication system of FIGS. 1A and 1B, according to an example.

FIG. 3 is a flow diagram of a method 300 for receiving and processing signals, according to an example. Although shown and described with respect to the system of FIGS. 1A-1B and 2, those of ordinary skill in the art will understand that any system configured to perform the steps of the method 300 in any technically feasible order falls within the scope of the present disclosure.

At step 302, a transceiver subsystem 120 of an acoustic lens multi-beam communication system 100 receives signals. In some examples, these signals are radio frequency signals and are incident on an antenna array 103. At step 304, the communication system 100 amplifies and converts the radio frequency signals into acoustic signals. In some examples, this conversion occurs via a portion of a lensing subsystem 110. More specifically, the antenna array 103 converts the radio frequency signals into electrical signals, which are amplified using receiving amplifier array 104 and optionally converted to another frequency band by mixers 105. A lensing subsystem 110 that includes a piezoelectric material has antenna ports 107. The antenna ports 107 are associated with an interface between electrically conductive material and piezoelectric material (e.g., from the lensing subsystem 110), and the piezoelectric material converts the electrical signals into acoustic signals.

At step 306, the communication system 100 focuses the acoustic waves to generate focused acoustic waves. In some examples, the lensing substrate 101 is configured to perform this focusing. The acoustic waves form an image on a first set of beam ports 108 and/or a second set of beam ports 109. At step 308, the communication system 100 converts focused acoustic waves into electrical signals for further processing. In some examples, the first beam ports 108 and/or second beam ports 109 are associated with an interface between the lensing substrate 101 and an electrically conductive material. This interface converts the focused acoustic waves into electrical signals. The further processing includes any technically feasible manner of using the focused signals, such as performing processing to discern individual sources of the radio frequency signals based on the electrical signals that result from step 306.

Figure 4:
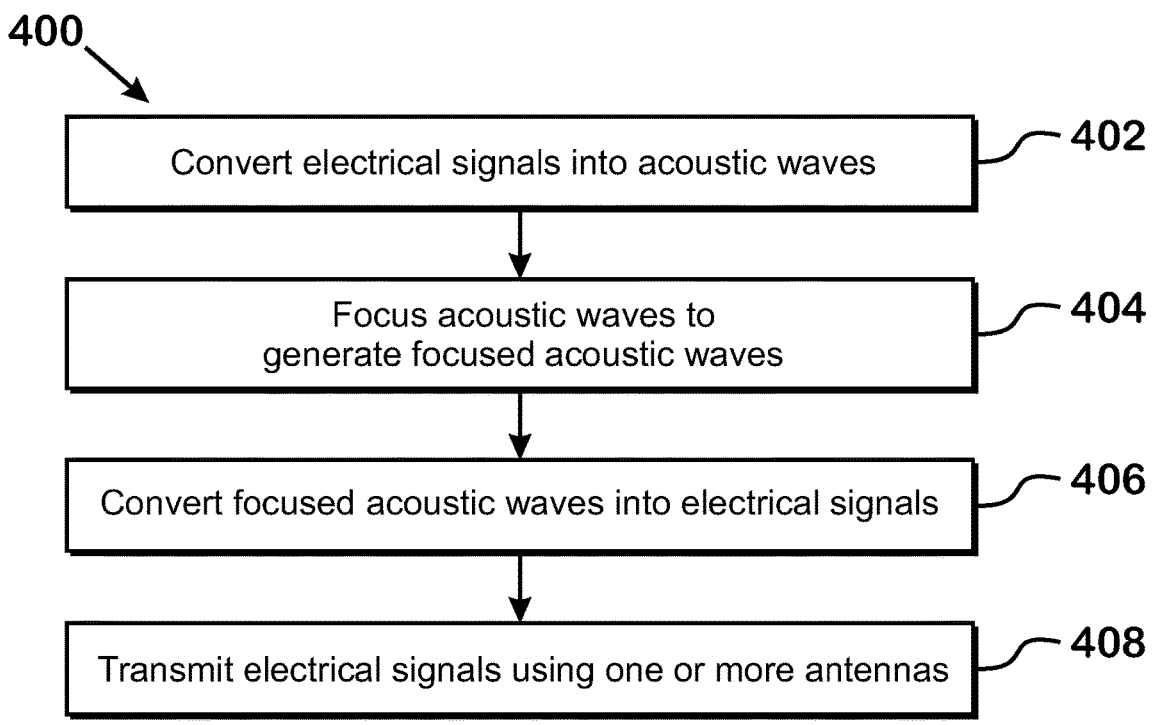
FIG. 4 is a flow diagram of a method for transmitting signals with the communication system of FIGS. 1A and 1B, according to an example.

FIG. 4 is a flow diagram of a method 400 for transmitting signals, according to an example. Although shown and described with respect to the system of FIGS. 1A-1B and 2, those of ordinary skill in the art will understand that any system configured to perform the steps of the method 400 in any technically feasible order falls within the scope of the present disclosure.

At step 402, the communication system 100 converts electrical signals into acoustic waves. In some examples, this conversion is performed by the first set of beam ports 108 and/or the second set of beam ports 109, which interface to a lensing substrate 101. At step 404, the communication system 100 focuses the acoustic waves to generate focused acoustic waves. In some examples, the lensing substrate 101 performs this focusing.

At step 406, the communication system 100 converts the acoustic waves into electrical signals. In some examples, this occurs via the antenna ports 107. At step 408, the communication system 100 optionally converts he signals to another frequency band using mixers 105, amplifies the signals with transmitting amplifiers array 111 and transmits the generated electrical signals as radio frequency electromagnetic signals using the antenna array 103.

Although described with certain details, it should be understood that any of a wide variety of modifications are within the scope of the present disclosure. In one example, although a certain configuration is shown for the transceiver subsystem 120, including receiving amplifier array 104, transmitting amplifier array 111, a local oscillator 106, and mixers 105, are shown, the transceiver subsystem could be implemented as any system that receives radio frequency signals, and converts those radio frequency signals to electrical signals. In other words, the transceiver subsystem 120 is implementable as any technically feasible form of transceiver.

What is claimed is:

1. A communication system comprising:
a communication device comprising one of a receiver, a transmitter, or a transceiver; and
an acoustic lensing subsystem that includes a lensing substrate and antenna ports that interface with the lensing substrate and that are coupled to one or more transducers having a direct current or slow-varying bias to provide gain and/or phase offsets for calibration,
wherein the acoustic lensing subsystem is configured to:
convert, via the antenna ports, electrical signals into acoustic signals in a receiver mode;
focus, via the lensing substrate, the acoustic signals to generate focused acoustic signals; and
output the focused acoustic signals,
wherein the antenna ports are configured to convert second acoustic signals into second electrical signals in a transmitter mode.

2. The communication system of claim 1, further comprising:
a processor configured to operate the communication device and acoustic lensing subsystem in one or both of the receiver mode or the transmitter mode.

3. The communication system of claim 1, wherein:
in a receiver mode, the communication device is configured to convert received electromagnetic signals into the electrical signals.

4. The communication system of claim 1, wherein:
in the transmitter mode, the acoustic lensing subsystem is configured to receive input signals, convert the input signals into the second acoustic signals, focus the second acoustic signals to generate focused acoustic signals, convert the focused acoustic signals into output electrical signals, and provide the output electrical signals to the communication device; and
the communication device is configured to transmit the electrical signals.

5. The communication system of claim 1, wherein the acoustic lensing subsystem further includes beam ports that interface with the lensing substrate configured to convert transmit electrical signals into transmit acoustic signals in the transmitter mode and to convert receive acoustic signals into receive electrical signals in the receiver mode.

6. The communication system of claim 5, wherein the beam ports are coupled to one or more transducers having a direct current or slow-varying bias to provide gain and/or phase offsets for calibration.

7. The communication system of claim 1, wherein the communication device includes an antenna configured to convert electromagnetic signals into the electrical signals to provide to the lensing subsystem.

8. The communication system of claim 1, wherein the communication device includes an antenna configured to convert the second electrical signals from the lensing subsystem into electromagnetic signals for transmission.

9. The communications system of claim 1, wherein:
the acoustic lensing subsystem further comprises one or more transducers configured to produce a plurality of acoustic waves of different vibration modes, and
the acoustic lensing subsystem is configured to simultaneously process multiple spatially-separate and/or vibrationally-separate acoustic signals.

10. The communication system of claim 1, wherein:
the acoustic lensing subsystem is further configured to simultaneously convert multiple spatially-separated and/or polarization-separated electromagnetic signals into acoustic signals, wherein the conversion is performed via transducers having different vibration modes; and
the acoustic lensing subsystem is further configured to simultaneously resolve multiple focused signals having different vibration modes into multiple separate output electrical signals.

11. The communication system of claim 1, wherein:
the acoustic lensing subsystem is further configured to simultaneously convert multiple input electric signals into spatially-separated and/or vibration mode separated acoustic signals via transducers with different vibration modes; and
the acoustic lensing subsystem is further configured to simultaneously create multiple focused electromagnetic signals having different polarizations.

12. The communication system of claim 1, wherein the acoustic lensing subsystem comprises:
one or more lensing substrates stacked and mechanically coupled, wherein the one or more lensing substrates are configured to process signals received from or transmitted to either or both of a one or two-dimensional antenna array; and wherein one or more beam ports are configured to process a one or two-dimensional image received or transmitted through the antenna array.

13. A method comprising:

converting, via antenna ports that interface with a lensing substrate, electrical signals into acoustic signals in a receiver mode;

focusing the acoustic signals via the lensing substrate to generate focused acoustic signals;

output the focused acoustic signals;

converting, via the antenna ports, transmit acoustic signals into transmit electrical signals in a transmitter mode; and biasing the antenna ports to provide gain and/or phase offsets for calibration.

14. The method of claim 13, further comprising:

operating in the receiver mode, comprising converting received electromagnetic signals into the electrical signals.

15. The method of claim 13, further comprising:

operating in the transmitter mode, comprising receiving input signals, converting the input signals into the transmit acoustic signals, focusing the transmit acoustic signals to generate focused acoustic signals, converting the focused acoustic signals into output electrical signals, and providing the output electrical signals to a communication device; and transmitting the output electrical signals.

16. The method of claim 13, further comprising:

converting input electrical signals into the transmit acoustic signals via beam ports that interface with the lensing substrate in the transmitter mode; and converting the focused acoustic signals into receive electrical signals via the beam ports in the receiver mode.

17. The method of claim 16, further comprising:

biasing the beam ports to provide gain and/or phase offsets for calibration.

18. The method of claim 13, further comprising:

converting the transmit electrical signals into electromagnetic signals for transmission.

19. The method of claim 13, further comprising:

producing a plurality of acoustic waves of different vibration modes via one or more transducers of the acoustic lensing subsystem; and simultaneously processing multiple spatially-separate and/or vibrationally-separate acoustic signals.

20. The method of claim 13, further comprising:

simultaneously converting multiple spatially-separated and/or polarization-separated electromagnetic signals into acoustic signals, wherein the conversion is performed via transducers having different vibration modes; and simultaneously resolving multiple focused signals having different vibration modes into multiple separate output electrical signals.

21. The method of claim 13, further comprising:

simultaneously converting multiple input electric signals into spatially-separated and/or vibration mode separated acoustic signals via transducers with different vibration modes; and simultaneously creating multiple focused electromagnetic signals having different polarizations.

* * * * *